United States Patent
Xie et al.

(10) Patent No.: US 11,034,133 B2
(45) Date of Patent: Jun. 15, 2021

(54) METAL COMPOSITE WIRE

(71) Applicant: Jiangsu Greenshine Supcon Tech Co., Ltd., Jiangsu (CN)

(72) Inventors: Guofeng Xie, Jiangsu (CN); Hengbao Xie, Jiangsu (CN)

(73) Assignee: Jiangsu Greenshine Supcon Tech Co., Ltd., Jiangsu (CN)

( * ) Notice: Subject to any disclaimer, the term of this patent is extended or adjusted under 35 U.S.C. 154(b) by 0 days.

(21) Appl. No.: 16/886,025

(22) Filed: May 28, 2020

(65) Prior Publication Data

US 2020/0376807 A1    Dec. 3, 2020

(30) Foreign Application Priority Data

May 28, 2019   (CN) .......................... 201910449498.2

(51) Int. Cl.
    *B32B 15/20*      (2006.01)
    *B32B 15/18*      (2006.01)
    (Continued)

(52) U.S. Cl.
    CPC .............. *B32B 15/017* (2013.01); *B32B 1/00* (2013.01); *B32B 3/00* (2013.01); *B32B 3/02* (2013.01);
    (Continued)

(58) Field of Classification Search
    CPC .. B32B 7/04; B32B 5/14; B32B 5/145; B32B 2311/20; B32B 2311/12; B32B 2311/22;
    (Continued)

(56) References Cited

U.S. PATENT DOCUMENTS 3,760,092 A *   9/1973   Woolcock ............... H01L 39/14
                                                          174/15.5

FOREIGN PATENT DOCUMENTS

CN       101249526      8/2008
CN       103021501      4/2013
(Continued)

OTHER PUBLICATIONS

Machine Translation, Zhang et al., CN 108154966 A, Jun. 2018. (Year: 2018).*

*Primary Examiner* — Michael E. La Villa

(74) *Attorney, Agent, or Firm* — Gary J. Gershik

(57) ABSTRACT

The present invention discloses a metal composite wire capable of increasing a tightness degree of copper-aluminum bonding. The metal composite wire includes a metal core rod. Continuous spiral grooves are formed in a surface of the core rod. The core rod is cladded with a metal cladding layer with higher electrical conductivity than the core rod. An average depth of the continuous spiral grooves ≤1/10 of a thickness of the metal cladding layer. By setting the thickness of the metal cladding layer as $t_1$, a specific gravity of the metal cladding layer as $\rho_1$, a diameter of the core rod as R, the average depth of the continuous spiral grooves as h, and a specific gravity of the core rod as $\rho_2$, $$t_1 = \sqrt{\frac{(R-h)^2 \times \rho_1 + k \times (R-h)^2 \times \rho_2 - k \times (R-h)^2 \times \rho_1}{(1-k) \times \rho_1}} + h - R, \text{ and}$$

$$0.2 \leq k \leq 0.7.$$

The metal composite wire of the present invention can be widely applied to cable conductors and cable shielding braiding layers.

12 Claims, 1 Drawing Sheet

(51) Int. Cl.
  *B32B 15/01* (2006.01)
  *B32B 1/00* (2006.01)
  *B32B 3/26* (2006.01)
  *H01B 1/02* (2006.01)
  *H01B 5/02* (2006.01)
  *B32B 3/00* (2006.01)
  *B32B 3/02* (2006.01)
  *B32B 3/30* (2006.01)
  *B32B 5/14* (2006.01)
  *B32B 7/04* (2019.01)
  *B32B 15/04* (2006.01)
  *C23C 30/00* (2006.01)
  *H01B 1/00* (2006.01)

(52) U.S. Cl.
  CPC ............... *B32B 3/26* (2013.01); *B32B 3/263* (2013.01); *B32B 3/30* (2013.01); *B32B 5/14* (2013.01); *B32B 5/145* (2013.01); *B32B 7/04* (2013.01); *B32B 15/01* (2013.01); *B32B 15/04* (2013.01); *B32B 15/043* (2013.01); *B32B 15/18* (2013.01); *B32B 15/20* (2013.01); *C23C 30/00* (2013.01); *C23C 30/005* (2013.01); *H01B 1/00* (2013.01); *H01B 1/02* (2013.01); *H01B 1/023* (2013.01); *H01B 1/026* (2013.01); *H01B 5/02* (2013.01); *B32B 2307/202* (2013.01); *B32B 2311/12* (2013.01); *B32B 2311/18* (2013.01); *B32B 2311/20* (2013.01); *B32B 2311/22* (2013.01); *B32B 2311/24* (2013.01); *B32B 2311/30* (2013.01); *Y10T 428/1275* (2015.01); *Y10T 428/1291* (2015.01); *Y10T 428/12333* (2015.01); *Y10T 428/12375* (2015.01); *Y10T 428/12389* (2015.01); *Y10T 428/12451* (2015.01); *Y10T 428/12458* (2015.01); *Y10T 428/12486* (2015.01); *Y10T 428/12493* (2015.01); *Y10T 428/12736* (2015.01); *Y10T 428/12743* (2015.01); *Y10T 428/12757* (2015.01); *Y10T 428/12764* (2015.01); *Y10T 428/12903* (2015.01); *Y10T 428/12917* (2015.01); *Y10T 428/12924* (2015.01); *Y10T 428/2495* (2015.01); *Y10T 428/24942* (2015.01)

(58) Field of Classification Search
  CPC ............. B32B 2311/24; B32B 2311/18; B32B 2311/30; B32B 3/263; B32B 3/00; B32B 3/02; B32B 3/26; B32B 3/30; B32B 1/00; B32B 15/017; B32B 15/20; B32B 15/18; B32B 15/04; B32B 15/043; B32B 15/01; B32B 2307/202; H91B 5/02; H91B 1/026; H91B 1/023; H91B 1/02; H91B 1/00; C23C 30/00; C23C 30/005; Y10T 428/12333; Y10T 428/12375; Y10T 428/12389; Y10T 428/12451; Y10T 428/12458; Y10T 428/12486; Y10T 428/12493; Y10T 428/12903; Y10T 428/12736; Y10T 428/1291; Y10T 428/12743; Y10T 428/12917; Y10T 428/1275; Y10T 428/12924; Y10T 428/12757; Y10T 428/2495; Y10T 428/12764; Y10T 428/24942
  See application file for complete search history.

(56) References Cited

FOREIGN PATENT DOCUMENTS

| | | |
|---|---|---|
| CN | 103021502 | 4/2013 |
| CN | 203839069 | 9/2014 |
| CN | 204632355 | 9/2015 |
| CN | 105612265 | 5/2016 |
| CN | 105788698 | 7/2016 |
| CN | 108154966 A * | 6/2018 |

\* cited by examiner

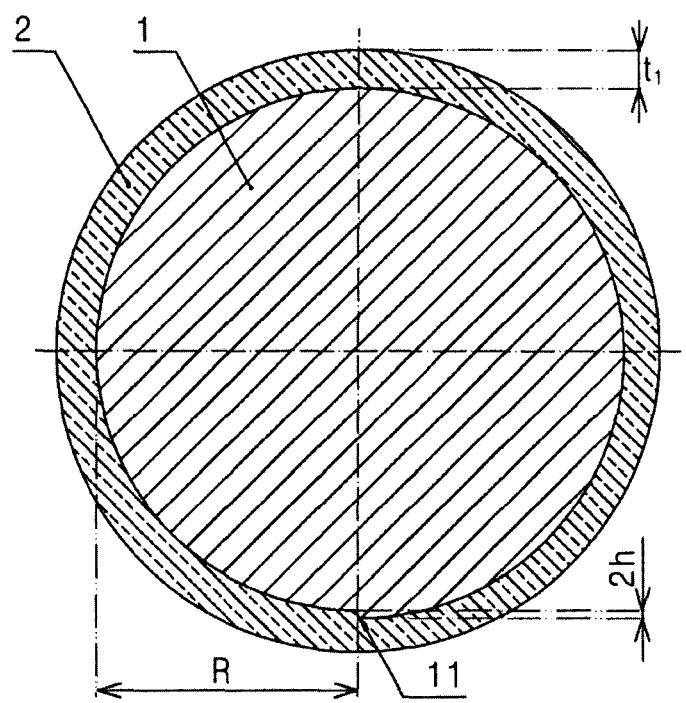

METAL COMPOSITE WIRE

RELATED APPLICATIONS

This application claims priority of Chinese Application No. 201910449498.2 filed May 28, 2019, the contents of each of which are hereby incorporated by reference into this application.

BACKGROUND

Technical Field

The present invention relates to a metal composite wire, and particularly relates to a metal composite wire for a cable conductor and a cable shielding braiding layer.

Related Art

At present, for a traditional metal composite wire, a copper strip is directly cladded on an aluminum rod or aluminum-magnesium alloy rod used as a core rod, argon arc welding is used to weld copper strip joints, and then, the wire with a required wire diameter is formed through multi-time drawing. It is well known that the mechanical properties of copper and aluminum are quite different, the copper strip and a core wire cannot reach a tight metallurgical bonding degree even after multi-time drawing at an area reduction ratio exceeding 80%. Additionally, in order to smoothly draw for many times, the copper strip needs to have a sufficient thickness. In general, the weight of copper accounts for more than 75% of the composite wire, but in such a way, copper consumption is increased, so that the production cost is increased, and the competitiveness of products is reduced.

SUMMARY

The technical problem to be solved by the present invention is to provide a metal composite wire capable of increasing a tightness degree of copper-aluminum bonding.

In order to solve the above technical problem, the present invention adopts the technical solution that a metal composite wire includes a metal core rod; continuous spiral grooves are formed in a surface of the core rod; the core rod is cladded with a metal cladding layer with higher electrical conductivity than the core rod; an average depth of the continuous spiral grooves ≤1/10 (10%) of a thickness of the metal cladding layer; and by setting the thickness of the metal cladding layer as $t_1$, a specific gravity of the metal cladding layer as $\rho_1$, a diameter of the core rod as R, the average depth of the continuous spiral grooves as h, and a specific gravity of the core rod as $\rho_2$, $$t_1 = \sqrt{\frac{(R-h)^2 \times \rho_1 + k \times (R-h)^2 \times \rho_2 - k \times (R-h)^2 \times \rho_1}{(1-k) \times \rho_1}} + h - R, \text{ and}$$

$$0.2 \leq k \leq 0.7.$$

As a preferred scheme, in the metal composite wire, the average depth of the continuous spiral grooves is controlled between 1% to 2/25 (1 to 8%) of the thickness of the metal cladding layer.

As a preferred scheme, in the metal composite wire, the core rod is an aluminum alloy rod. Through being metered in percentage by mass, the aluminum alloy rod contains 0.02 to 0.1% of silicon, 1.15 to 1.26% of iron, 0.18 to 0.24% of copper, 0.01 to 0.03% of titanium, ≤0.0025% of magnesium, ≤0.15% of all impurity elements (≤0.01% of each single impurity element), and the balance aluminum.

As a preferred scheme, in the metal composite wire, a content of the magnesium in the aluminum alloy rod is between 0.0015 to 0.0025%.

As a preferred scheme, in the metal composite wire, the impurity elements include manganese, zinc, nickel, and chromium.

As a preferred scheme, in the metal composite wire, through being metered in percentage by mass, a content of a manganese element ≤0.006%, a content of a zinc element ≤0.008%, a content of a nickel element ≤0.006%, and a content of a chromium element ≤0.002%.

As a preferred scheme, in the metal composite wire, the metal cladding layer is an oxygen-free copper layer, a low-oxygen copper layer, or a copper alloy layer.

The present invention has the beneficial effects that through formation of the continuous spiral grooves in the surface of the core rod and by controlling the relationship between the depth of the continuous spiral grooves and the thickness of the metal cladding layer, the bonding of the metal cladding layer and the aluminum is tighter, and the drawing of the formed composite wire material is smoother. Additionally, when the metal composite wire is drawn to a fine wire diameter, the grooves are negligible, so that the whole wire is round. Meanwhile, through such a microstructure, the finally obtained composite wire is enabled to acquire good high-frequency signal conduction performance and electric power transmission function, and consumption of the metal cladding layer is more proper (controlled between 20 to 70%), so that the cost is reduced. Additionally, the present invention further improves the conduction performance and tensile strength of the finally formed composite wire by using aluminum alloy as the core rod and controlling the contents of trace elements and impurity elements in the core rod.

BRIEF DESCRIPTION OF THE DRAWINGS

FIG. 1 is a schematic sectional structure diagram of a metal composite wire of the present invention.

Reference numerals in FIG. 1 are as follows: 1 denotes an aluminum alloy core rod; 11 denotes a continuous spiral groove; and 2 denotes an oxygen-free copper layer.

DETAILED DESCRIPTION

A specific implementation of a metal composite wire of the present invention will be described in detail by taking a copper-clad aluminum alloy as an example in conjunction with the accompanying drawings below.

As shown in FIG. 1, the metal composite wire of the present invention includes an aluminum alloy core rod 1. Continuous spiral grooves 11 are formed in a surface of the aluminum alloy core rod 1. The aluminum alloy core rod 1 is cladded with an oxygen-free copper layer 2 serving as a metal cladding layer with higher electrical conductivity than the aluminum alloy core rod 1. An average depth of the continuous spiral grooves 11≤1/10 (10%) of a thickness of the oxygen-free copper layer 2, and is preferably controlled between 1 to 8%.

By setting the thickness of the oxygen-free copper layer 2 as $t_1$, a specific gravity of the oxygen-free copper layer as pi, a diameter of the aluminum alloy core rod 1 as R, the average depth of the continuous spiral grooves 11 as h, and a specific gravity of the aluminum alloy core rod 1 as $\rho_2$, $$t_1 = \sqrt{\frac{(R-h)^2 \times \rho_1 + k \times (R-h)^2 \times \rho_2 - k \times (R-h)^2 \times \rho_1}{(1-k) \times \rho_1}} + h - R, \text{ and}$$

$$0.2 \leq k \leq 0.7.$$

Through being metered in percentage by mass, the aluminum alloy core rod 1 contains 0.02 to 0.1% of silicon, 1.15 to 1.26% of iron, 0.18 to 0.24% of copper, 0.01 to 0.03% of titanium, 0.0015 to 0.0025% of magnesium, ≤0.15% of all impurity elements (≤0.01% of each single impurity element), and the balance aluminum.

During practical application, the impurity elements generally include manganese, zinc, nickel and chromium. A content of a manganese element ≤0.006%, a content of a zinc element ≤0.008%, a content of a nickel element ≤0.006%, and a content of a chromium element ≤0.002%. The metal cladding layer further may be a low-oxygen copper layer or a copper alloy layer.

The tensile strength, elongation and electrical resistivity of the aluminum alloy core rod 1 are shown in the tables below:

| Serial number | Batch number | Number of pieces | Weight (Kg) | Physical performance | | |
|---|---|---|---|---|---|---|
| | | | | Tensile strength (MPa) (140-180) | Elongation (%) (16-25) | Electrical resistivity (nΩ·m) (28-30) |
| 1 | 8C93002703 | 1 | 2166 | 145 | 17 | 29.14 |
| 2 | 8C93002704 | 1 | 2260 | 145 | 19 | 29.31 |
| 3 | 8C93002705 | 1 | 2248 | 145 | 19 | 29.31 |
| 4 | 8C93002706 | 1 | 2270 | 145 | 19 | 29.31 |
| 5 | 8C93002707 | 1 | 2284 | 143 | 20 | 29.30 |
| 6 | 8C93002708 | 1 | 2268 | 143 | 20 | 29.30 |
| 7 | 8C93002709 | 1 | 2124 | 148 | 18 | 29.39 |
| Total | | 7 | | | | |

Through the above tables, the performance of the aluminum alloy core rod 1 completely reaches the requirements for manufacturing the composite wires such as the copper-clad aluminum alloy.

The foregoing descriptions are merely preferred embodiments of the present invention, and are not intended to limit the scope of the present invention. All equivalent changes and modifications made according to shapes, structures, features and spirits described in the scope of the claims of the present invention shall fall within the scope of the claims of the present invention.

What is claimed is:

1. A metal composite wire, comprising a metal core rod, wherein continuous spiral grooves are formed in a surface of the core rod; the core rod is cladded with a metal cladding layer with higher electrical conductivity than the core rod; an average depth of the continuous spiral grooves ≤1/10 of a thickness of the metal cladding layer; and by setting the thickness of the metal cladding layer as $t_1$, a specific gravity of the metal cladding layer as $\rho_1$, a diameter of the core rod as R, the average depth of the continuous spiral grooves as h, and a specific gravity of the core rod as $\beta_2$, $$t_1 = \sqrt{\frac{(R-h)^2 \times \rho_1 + k \times (R-h)^2 \times \rho_2 - k \times (R-h)^2 \times \rho_1}{(1-k) \times \rho_1}} + h - R, \text{ and}$$

$$0.2 \leq k \leq 0.7.$$

2. The metal composite wire according to claim 1, wherein the average depth of the continuous spiral grooves is controlled between 1% to 4/25 of the thickness of the metal cladding layer.

3. The metal composite wire according to claim 2, wherein the metal cladding layer is an oxygen-free copper layer, a low-oxygen copper layer, or a copper alloy layer.

4. The metal composite wire according to claim 1, wherein the core rod is an aluminum alloy rod; and through being metered in percentage by mass, the aluminum alloy rod contains 0.02 to 0.1% of silicon, 1.15 to 1.26% of iron, 0.18 to 0.24% of copper, 0.01 to 0.03% of titanium, ≤0.0025% of magnesium, ≤0.15% of all impurity elements (≤0.01% of each single impurity element), and the balance aluminum.

5. The metal composite wire according to claim 4, wherein the metal cladding layer is an oxygen-free copper layer, a low-oxygen copper layer, or a copper alloy layer.

6. The metal composite wire according to claim 4, wherein a content of the magnesium in the aluminum alloy rod is between 0.0015 to 0.0025%.

7. The metal composite wire according to claim 6, wherein the metal cladding layer is an oxygen-free copper layer, a low-oxygen copper layer, or a copper alloy layer.

8. The metal composite wire according to claim 4, wherein one or more elements amongst the impurity elements that are selected from the group consisting of manganese, zinc, nickel, or chromium, have an individual non-zero content in the aluminum alloy rod ≤0.01% by mass.

9. The metal composite wire according to claim 8, wherein the metal cladding layer is an oxygen-free copper layer, a low-oxygen copper layer, or a copper alloy layer.

10. The metal composite wire according to claim 8, wherein through being metered in percentage by mass, a content of a manganese element ≤0.006, a content of a zinc element ≤0.008%, a content of a nickel element ≤0.006%, and a content of a chromium element ≤0.002%.

11. The metal composite wire according to claim 10, wherein the metal cladding layer is an oxygen-free copper layer, a low-oxygen copper layer, or a copper alloy layer.

12. The metal composite wire according to claim 1, wherein the metal cladding layer is an oxygen-free copper layer, a low-oxygen copper layer, or a copper alloy layer.

* * * * *